United States Patent [19]

Roberts et al.

[11] Patent Number: 4,874,593
[45] Date of Patent: * Oct. 17, 1989

[54] CONVERSION OF PYROPHORIC $P_4$-CONTAINING MATERIAL TO $P_2O_5$ MATERIAL

[75] Inventors: Auston K. Roberts, Chino; William E. Trainer, Anaheim, both of Calif.; David L. Biederman, Columbia, Tenn.

[73] Assignee: Stauffer Chemical Company, Shelton, Conn.

[*] Notice: The portion of the term of this patent subsequent to Aug. 8, 2004 has been disclaimed.

[21] Appl. No.: 78,430

[22] Filed: Jul. 27, 1987

Related U.S. Application Data

[63] Continuation-in-part of Ser. No. 894,529, Aug. 8, 1986, Pat. No. 4,686,094.

[51] Int. Cl.$^4$ .................. C01B 25/12; C01B 25/01; C01B 25/02; C01B 25/04

[52] U.S. Cl. .................. 423/322; 423/317; 423/322; 423/323

[58] Field of Search .............. 423/304, 317, 322, 323

[56] References Cited

U.S. PATENT DOCUMENTS 2,925,326 2/1960 Pieper et al. .................. 423/304
4,686,094 8/1987 Roberts et al. .................. 423/322

Primary Examiner—Gregory A. Heller
Attorney, Agent, or Firm—Paul J. Juettner

[57] ABSTRACT

A process for treating a pyrophoric $P_4$-containing material to convert it to a substantially non-pyrophoric $P_2O_5$ material is described. The process comprises supplying streams of fluid $P_4$-containing material and an oxygen-containing gas to a reactor filled with water. The $P_4$-containing material and the oxygen and the oxygen-containing gas react with one another after both have entered the aqueous medium within the reactor to thereby form the desired $P_2O_5$ material.

5 Claims, 2 Drawing Sheets

CONVERSION OF PYROPHORIC P4-CONTAINING MATERIAL TO P2O5 MATERIAL

RELATED APPLICATION

This is a continuation-in-part of copending U.S. application Ser. No. 894,529, filed Aug. 8, 1986 entitled, "Treatment of Pyrophoric Elemental Phosphorus-Containing Material" now U.S. Pat. No. 4,686,904.

BACKGROUND OF THE PRESENT INVENTION

The aforementioned related U.S. patent application teaches a method of treating pyrophoric elemental phosphorus-containing material to render it less pyrophoric. The treatment comprises treating such pyrophoric material while it is under a liquid blanketing layer with an oxygen-containing gas. A preferred blanketing liquid is water and either air, an oxygen-enriched gas stream, pure oxygen, and the like can be used as the oxygen-containing gas. Further details regarding the procedure whereby such elemental $P_4$-containing material can be converted to a less pyrophoric form can be found in the copending prior application, which is incorporated herein by reference.

SUMMARY OF THE PRESENT INVENTION

The present process is one for treating a pyrophoric $P_4$-containing material to convert it to substantially non-pyrophoric $P_2O_5$ material which can be recovered as a useful product. The process comprises supplying separate streams of fluid containing $P_4$-containing material and an oxygen-containing gas to a reactor filled with water such that the $P_4$-containing material and oxygen in the oxygen-containing gas react with one another after both have entered the aqueous medium within the reactor to thereby form the $P_2O_5$ material.

DESCRIPTION OF THE DRAWINGS

The present process will be more fully understood by reference to the Drawings which form a portion of the present specification wherein.

DETAILED DESCRIPTION OF THE PRESENT INVENTION

Figure 1:
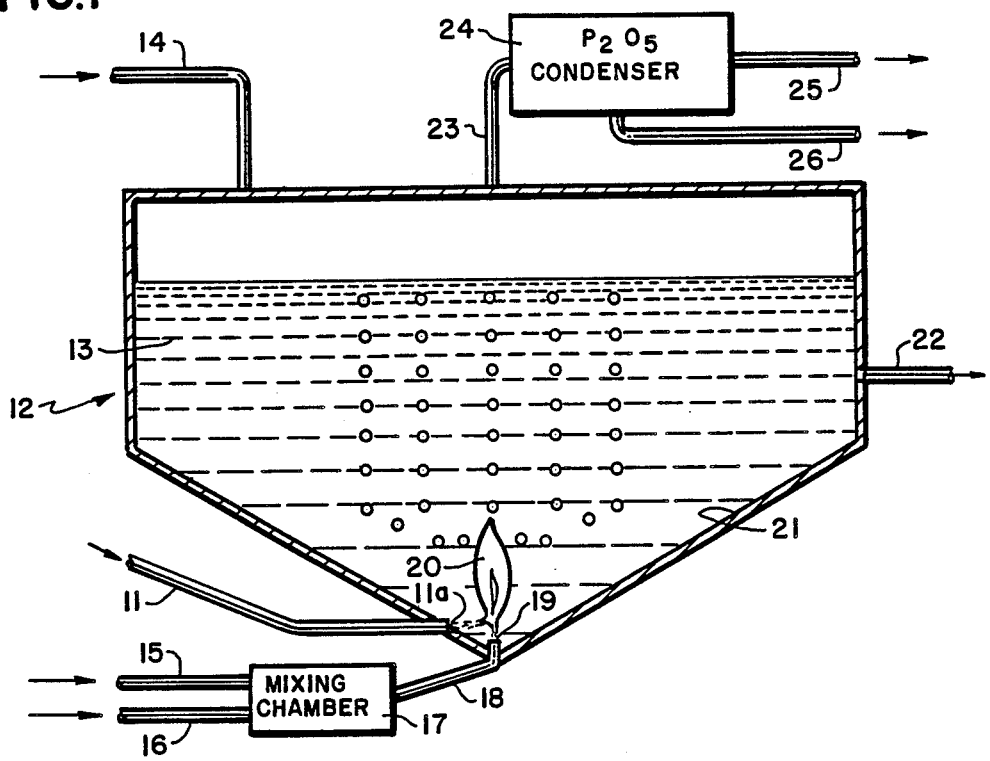
FIG. 1 is a schematic view showing apparatus for the conversion of pyrophoric $P_4$-containing material so that a dry $P_2O_5$ material can be recovered therefrom.

FIG. 1 illustrates, in schematic fashion, apparatus suitable for dry $P_2O_5$ production. The $P_4$ material, preferably in fluid or molten form, is fed via line 11 from a metering tank (not shown) into a reactor 12 containing a suitable liquid blanket 13 for the intended reaction through an appropriate induction nozzle 11a. Water is the preferred liquid blanketing agent and is supplied as needed by line 14. The material forming reactor 12 should be of a type which will resist attack by phosphoric acid since, as the process proceeds, the generation of $P_2O_5$ within such aqueous layer causes the layer to become progressively more acidic. Pressurized air and pure oxygen are fed via lines 15 and 16, respectively, to mixing chamber 17 and thence via line 18 to a suitable gas nozzle 19 into the liquid blanketing material 13. The $P_4$ and oxygen-containing gas first meet within the liquid 13 in a $P_4$ conversion zone 20 where the $P_4$ is oxidized to $P_2O_5$ values. The liquid aqueous blanket acts as an unusually effective heat sink to control the highly exothermic reaction between $P_4$ and $O_2$ at very modest temperatures (e.g., about 90°–100° C.) outside the zone of actual $P_4/O_2$ oxidation. In a preferred embodiment, pure oxygen is used. Preferably, a high temperature lining 21 is used to jacket the reactor 12.

Saturated $P_2O_5$ liquid can be removed for use via line 22 while $P_2O_5$-rich gases are fed via line 23 to a $P_2O_5$ condenser 24. Waste gases are removed from the condenser 24 via line 25 to a scrubber (not shown) with dry $P_2O_5$ material being removed via line 26 for appropriate storage. The scrubber (as well as all other portions of the apparatus which will come in contact with the $P_2O_5$ liquid) should be made of phosphoric acid resistant materials.

Figure 2:
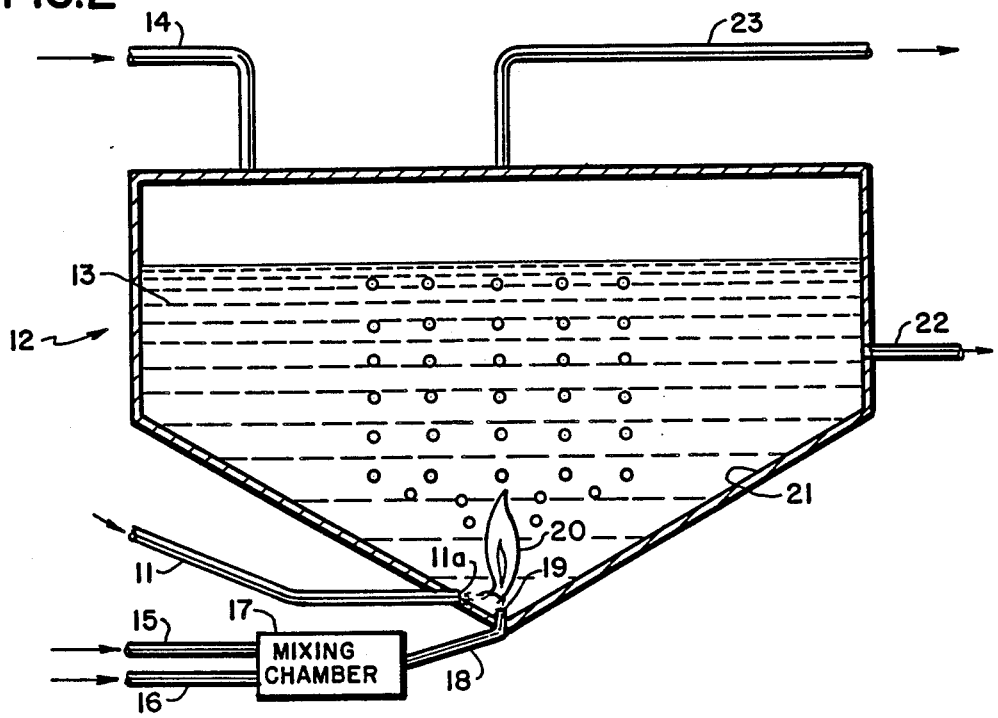
FIG. 2 is a view similar to that shown in FIG. 1 lacking a $P_2O_5$ condenser apparatus which is used in the apparatus of FIG. 1 to recover the $P_2O_5$ material in dry form.

FIG. 2 shows a variant of FIG. 1 with the $P_2O_5$ condenser and associated lines being removed. Line 23 conveys gases to a scrubber (not shown). In all other respects, the depicted apparatus is similar to that depicted in FIG. 1.

Figure 3:
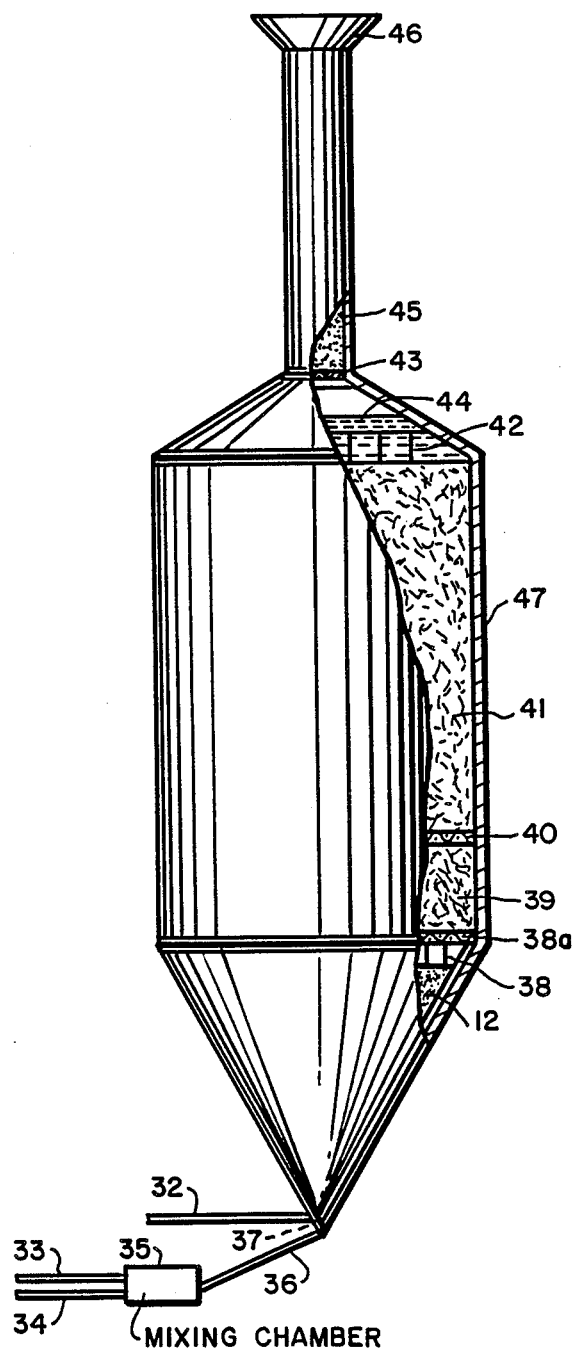
FIG. 3 is a schematic view of a single element conversion unit for treating a $P_4$-containing material such as $P_4$-containing sludge.

FIG. 3 illustrates a single element $P_4$ conversion unit which would be suitable for converting a pyrophoric $P_4$-containing material, such as $P_4$-containing sludge to $P_2O_5$ material. The bottom section 31 is the $P_4$ conversion area wherein $P_4$ is reacted under an appropriate liquid (e.g., water) blanket with an oxygen-containing gas. This conversion area is the reactor, and associated apparatus, shown in FIGS. 1 and 2. In FIG. 3, line 32 provides pyrophoric $P_4$ material (e.g., $P_4$ sludge) while lines 33 and 34 provide air and high pressure pure oxygen to mixing chamber 35 and thence through line 36 to the conversion area (or reactor) 31. A trap 37 can be provided around conversion area 31 to trap any non-convertible impurities.

Situated above conversion area 31 is a high temperature distillation tray 38, high temperature packing grid 38a, a uniform high temperature packing 39, packing grid 40, a stratified medium temperature wet packing, a distribution tray 42, and another packing grid 43. The liquid level 44 of the blanketing liquid is also shown in FIG. 3. Above the foregoing structure is provided a low temperature packing element 45 and an exhaust stack 46. The areas of the foregoing apparatus below the low temperature packing 45 are preferably encased in an insulating jacket 47.

The present invention is further illustrated by the Example which follows.

EXAMPLE

An 18,500-gallon tank used for elemental $P_4$ storage for forty-two (42) years was utilized. A revetment tank surrounded this tank and contained 20,00 gallons of water. The tank holding the $P_4$ was made of ⅜-inch carbon steel, was seamless, and was double welded at its dome and cone.

The sparging of the $P_4$ material was done through a 1-inch stainless steel line approximately 2 inches above the $P_4$ level. The tank contained about 11,000 gallons of phossy water cover over 3,000 gallons of $P_4$ sludge and debris. The sparging was done with pure oxygen in six-pack gas cylinder configurations containing about 2100 cubic feet of oxygen in each gas cylinder at an average pressure of about 35 lbs/in². Plant air was continuously sparged into the dome of the tank to maintain a positive pressure into a suitably attached scrubber of 8 lbs/in². The pressure on the dome top averaged about 1 lb/in².

The scrubber was a 5-foot column containing 1,200 gallons of water and a Brinks element. Gas coils from the $P_4$ tank containing about fifty ¼ inch holes entered the scrubber at 6 and 18 inches from its bottom.

The following average temperature conditions were noted during the sparging operation:

| Location | °C. |
|---|---|
| Bottom of Water Cover | 96 |
| Center of Water Cover | 85 |
| Top of Water Cover | 90 |
| Out Gas | 95 |
| Scrubber | 38 |
| Scrubber Skin | 30 |
| Revetment | 60 |

The relatively low (85°–96° C.) temperatures detected in the water cover environs and in the out gas was truly unexpected.

A total of 29 six-packs of oxygen were used over a total burn time of 74 hours over an eight-day period with periodic sampling of the cover water being made. Two samples were generally taken at each sampling time. All samples appeared to be about 50/50 $H_3PO_4/H_3PO_3$ on a weight basis:

| Day No. | Sample | % $H_3PO_4$ | Iron (Fe) |
|---|---|---|---|
| 1 | A | 1.00 | 278 ppm |
| 1 | B | 0.97 | 170 ppm |
| 2 | A | 2.46 | 1150 ppm |
| 2 | B | 2.42 | 946 ppm |
| 3 | A | 4.24 | 0.51% |
| 3 | B | 4.25 | 0.53% |
| 3 | C | 4.54 | 0.57% |
| 3 | D | 4.55 | 0.65% |
| 4 | A | 5.36 | 0.69% |
| 4 (AM) | B | 5.37 | 0.81% |
| 4 (AM) | C | 5.58 | 0.80% |
| 5 (PM) | A | 6.22 | 1.03% |
| 5 (PM) | B | 6.24 | 1.09% |
| 6 (AM) | A | 7.39 | 1.15% |
| 6 (AM) | B | 7.38 | 1.10% |
| 6 (PM) | C | 8.22 | 1.28% |
| 6 (PM) | D | 8.15 | 1.31% |
| 7 (AM) | A | 9.13 | 1.42% |
| 7 (AM) | B | 9.12 | 1.33% |
| 7 (PM) | C | 9.15 | 1.37% |
| 7 (PM) | D | 9.46 | 1.57% |

The above data indicated a generally increasing $H_3PO_4$ content as the $O_2$ treatment of the $P_4$ proceeded with a generally increasing iron content as the increasing acid content of the aqueous liquid reacted with the mild steel surface of the tank. Continued treatment for a total of fourteen days produced an $H_3PO_4$ content of 21.09% and an iron content of 2.06%.

The foregoing has been presented for purposes of illustration only and should not be construed in a limiting sense. The scope of protection that is sought is set forth in the claims which follow.

We claim:

1. A process for treating a pyrophoric $P_4$-containing material to convert at least a portion of it to substantially non-pyrophoric $P_2O_5$ material which comprises supplying streams of fluid $P_4$-containing material and an oxygen-containing gas to a reactor filled with water such that the $P_4$-containing material and oxygen in the oxygen-containing gas react with one another after both have entered the aqueous medium within the reactor to thereby form the $P_2O_5$ material.

2. A process as claimed in claim 1 wherein substantially pure oxygen is used as the oxygen-containing gas.

3. A process as claimed in claim 1 wherein the $P_2O_5$ material is in the form of a phosphoric acid solution.

4. A process as claimed in claim 1 wherein substantially pure oxygen is used as the oxygen-containing gas and the $P_2O_5$ material is in the form of a phosphoric acid solution.

5. A process as claimed in claim 1 wherein an oxygen-enriched gas is used as the oxygen-containing gas.

* * * * *